(12) United States Patent
Dadu et al.

(10) Patent No.: US 9,325,497 B2
(45) Date of Patent: *Apr. 26, 2016

(54) POWER LINE BASED THEFT PROTECTION OF ELECTRONIC DEVICES

(71) Applicant: Intel Corporation, Santa Clara, CA (US)

(72) Inventors: Saurabh Dadu, Tigard, OR (US); Gyan Prakash, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/524,679

(22) Filed: Oct. 27, 2014

(65) Prior Publication Data

US 2015/0046698 A1 Feb. 12, 2015

Related U.S. Application Data

(63) Continuation of application No. 13/715,299, filed on Dec. 14, 2012, now Pat. No. 8,874,898.

(51) Int. Cl.
*H04L 29/06* (2006.01)
*H04L 9/08* (2006.01)
*H04B 3/54* (2006.01)
*H04L 9/28* (2006.01)

(52) U.S. Cl.
CPC .............. *H04L 9/0866* (2013.01); *H04B 3/54* (2013.01); *H04B 3/542* (2013.01); *H04L 9/0891* (2013.01); *H04L 9/28* (2013.01); *H04B 2203/5458* (2013.01); *H04L 9/0822* (2013.01)

(58) Field of Classification Search
CPC ............ H04B 3/542; H04B 3/54; H04L 9/28; H04L 9/0866; H04L 9/0891
USPC ......................................... 713/153, 155, 161
See application file for complete search history.

(56) References Cited

U.S. PATENT DOCUMENTS

| 8,301,570 | B2 * | 10/2012 | Sathyan et al. | ................. | 705/56 |
| 2004/0093523 | A1 * | 5/2004 | Matsuzaki et al. | ............ | 713/201 |
| 2009/0208002 | A1 * | 8/2009 | Koehane et al. | ................ | 380/44 |
| 2010/0235644 | A1 * | 9/2010 | Oxford | ......................... | 713/181 |
| 2010/0268937 | A1 * | 10/2010 | Blom et al. | .................. | 713/153 |

* cited by examiner

*Primary Examiner* — Amare F Tabor
(74) *Attorney, Agent, or Firm* — Barnes & Thornburg LLP

(57) ABSTRACT

Technologies for establishing and managing a connection with a power line communication network include establishing a communication connection between an electronic device and a security server. A default device encryption key associated with the electronic device is changed to correspond with a new device encryption key of the security server. Thereafter, the electronic device may only join a power line communication network of a particular security server using a network membership key, which is encrypted with the device encryption key that the particular security server associates to the electronic device. The electronic device contains a circuit interrupt to interrupt a circuit of the electronic device if the electronic device is not able to successfully decrypt the network membership key.

20 Claims, 5 Drawing Sheets

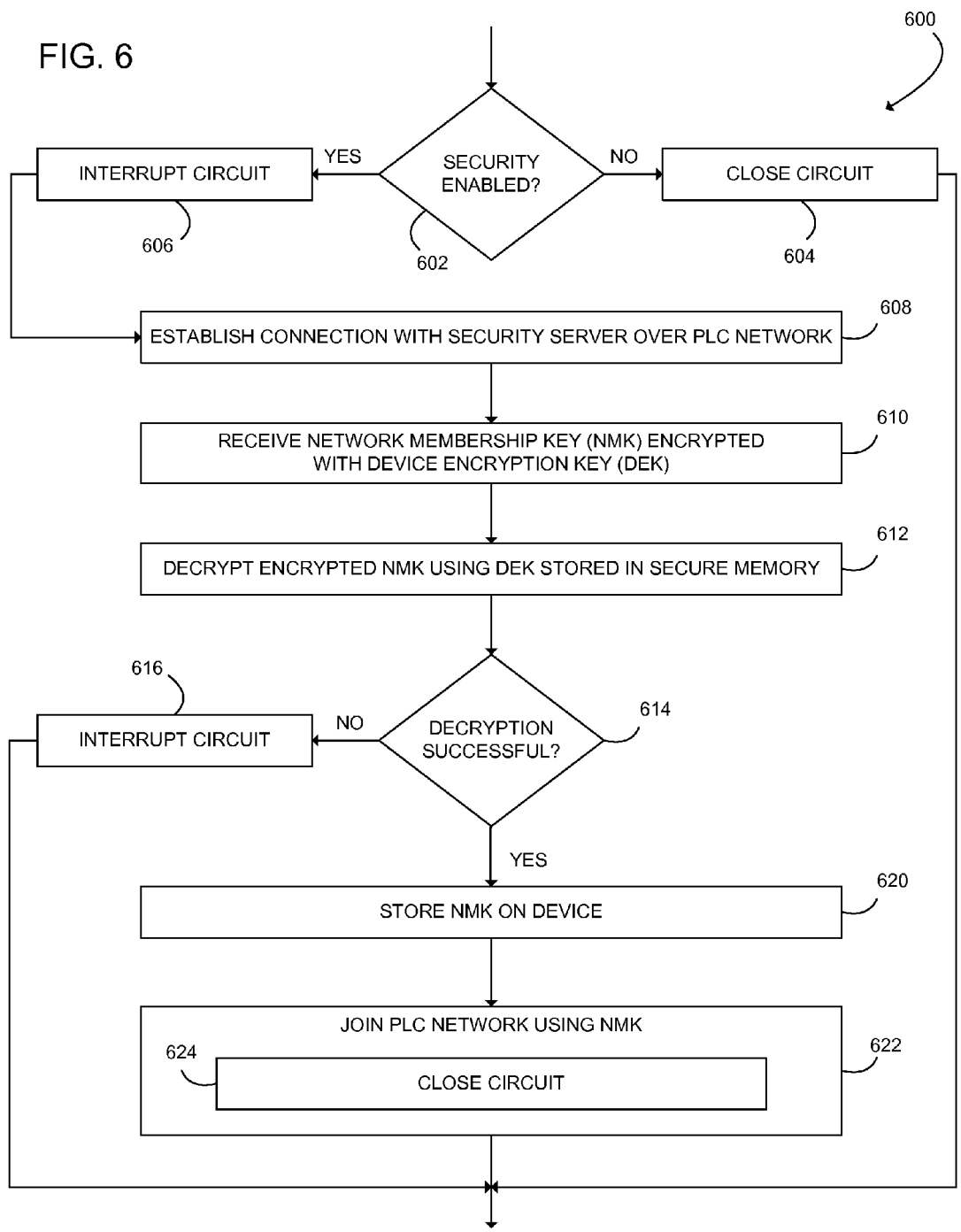

POWER LINE BASED THEFT PROTECTION OF ELECTRONIC DEVICES

CROSS-REFERENCE TO RELATED APPLICATIONS

This application is a continuation application of U.S. application Ser. No. 13/715,299, entitled "Power Line Based Theft Protection of Electronic Devices," which was filed on Dec. 14, 2012.

BACKGROUND

In today's society, electronic devices are some of the most valuable personal properties that one would expect to find in a home or place of business. Due to their value and oftentimes mobile nature, electronic devices are prime candidates for theft. Public and private institutions alike struggle to protect their electronic devices from such theft. For example, hotels and universities often chain or otherwise tether expensive devices such as projectors and televisions to a stationary or heavy object to deter theft. Similarly, hotels typically require guests to leave credit card account information to cover the costs of stolen devices. However, guests may deny involvement in the theft, cancel the credit card after stealing something, or even use a fraudulent credit card.

Electronic devices are typically designed to include a general purpose processor and, in some devices, security engines. In many cases, the security engines may be used to execute sophisticated anti-theft logic. Such electronic devices typically utilize standard networking devices and protocols such as Ethernet, Wi-Fi®, and 3G to interact with remote devices. Although, power lines are designed for the transmission of AC power and operate at a standard frequency, power line communication systems may be used to permit communication between devices by utilizing different frequency bands to facilitate the communication between the devices along the same power line.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 6 is a simplified flow diagram of at least one embodiment of a method for managing circuitry of the electronic device of the system of FIG. 1.

DETAILED DESCRIPTION OF THE DRAWINGS

Figure 1:
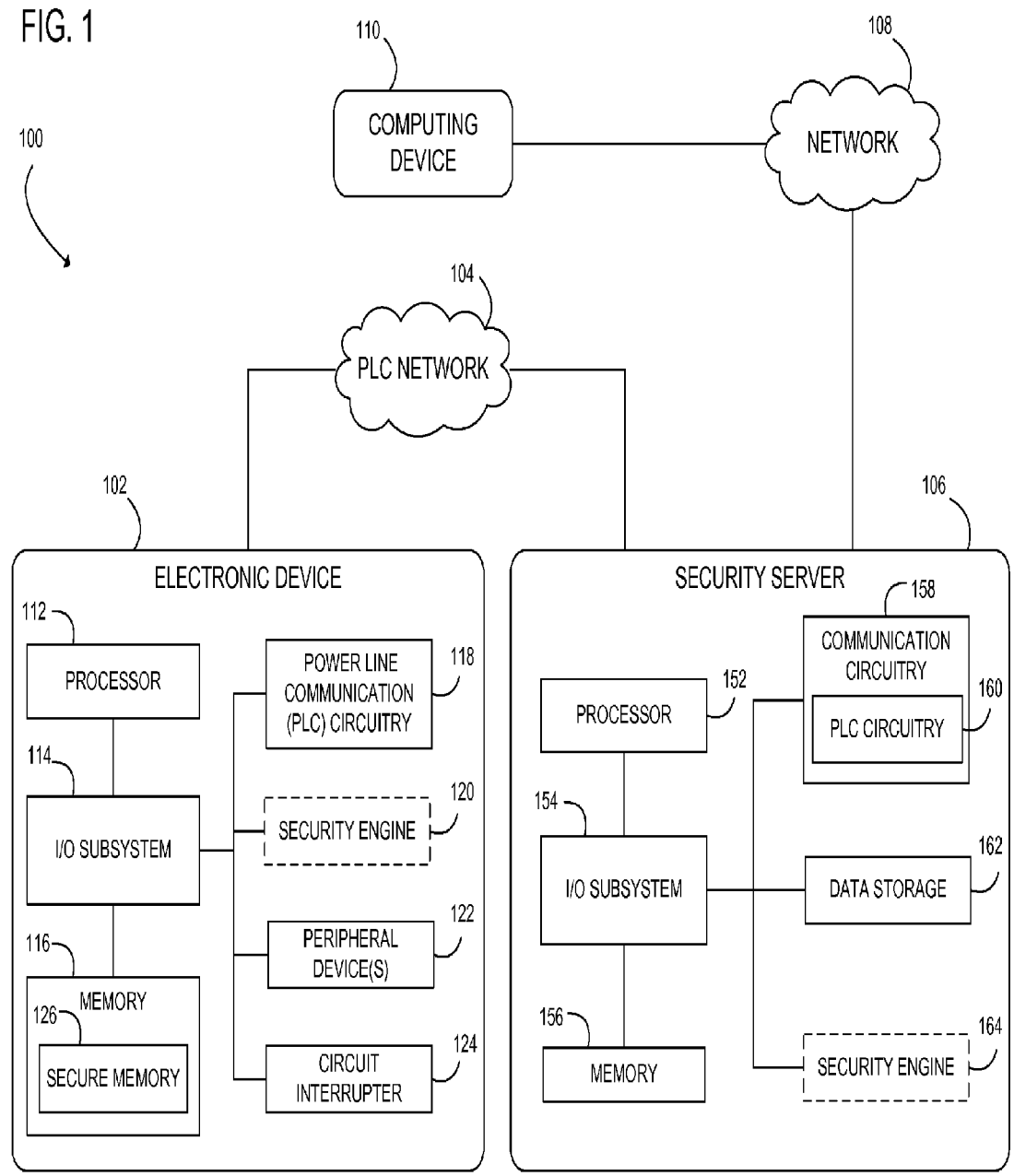
FIG. 1 is a simplified block diagram of at least one embodiment of a system for establishing and managing a connection with a power line communication network.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for establishing and managing a connection with a power line communication network includes an electronic device 102, a power line communication (PLC) network 104, a security server 106, a network 108, and a computing device 110. In use, as discussed in more detail below, the electronic device 102 may communicate with the security server 106 over the PLC network 104 to, for example, exchange cryptographic keys and receive instructions and/or commands. Further, the security server 106 may communicate with the computing device 110 over the network 108 to receive device data and register a particular electronic device 102 to access the PLC network 104. In some embodiments, each security server 106 is associated with a particular PLC network 104 (i.e., referred to as "its PLC network" 104). Although only one electronic device 102, one PLC network 104, one security server 106, one network 108, and one computing device 110 are illustratively shown in FIG. 1, the system 100 may include any number of electronic devices 102, PLC networks 104, security servers 106, networks 108, and computing devices 110 in other embodiments.

The electronic device 102 may be embodied as any type of electronic device that is configured to receive power directly or indirectly through a power line and capable of establishing a communication connection with the security server 106 over the PLC network 104 and performing the functions described herein. For example, the electronic device 102 may be embodied as a television, alarm clock, coffee maker, video projector, hair dryer, desktop computer, or other electronic appliance and/or device. As shown in FIG. 1, the illustrative electronic device 102 includes a processor 112, an input/output ("I/O") subsystem 114, a memory 116, a PLC circuitry 118, a security engine 120, one or more peripheral devices 122, and a circuit interrupter 124. Of course, the electronic device 102 may include other or additional components, such as those commonly found in an electronic device (e.g., various input/output devices), in other embodiments. Additionally, in some embodiments, one or more of the illustrative components may be incorporated in, or otherwise from a portion of, another component. For example, the memory 116, or portions thereof, may be incorporated in the processor 112 in some embodiments.

The processor 112 may be embodied as any type of processor capable of performing the functions described herein. For example, the processor may be embodied as a single or multi-core processor(s), digital signal processor, microcontroller, or other processor or processing/controlling circuit. Similarly, the memory 116 may be embodied as any type of volatile or non-volatile memory or data storage capable of performing the functions described herein. In operation, the memory 116 may store various data and software used during operation of the electronic device 102 such as operating systems, applications, programs, libraries, and drivers. The memory 116 is communicatively coupled to the processor 112 via the I/O subsystem 114, which may be embodied as circuitry and/or components to facilitate input/output operations with the processor 112, the memory 116, and other components of the electronic device 102. For example, the I/O subsystem 114 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 114 may form a portion of a system-on-a-chip (SoC) and be incorporated, along with the processor 112, the memory 116, and other components of the electronic device 102, on a single integrated circuit chip. In some embodiments, the memory 116 may include a portion of secure memory 126 to, for example, store cryptographic keys (e.g., a device encryption key). In various embodiments, the secure memory 126 may be separate from the memory 116 and/or a secure partition of the memory 116.

The PLC circuitry 118 of the electronic device 102 may be embodied as any communication circuit, device, electronic component, or collection thereof, capable of enabling communications between the electronic device 102 and the security server 106 and/or other remote devices over a PLC network 104 associated with a power line. In some embodiments, the power line is a power wiring system designed for the transmission of Alternating Current (AC) power at a standard utility grid frequency (e.g., 60 Hertz). It should be appreciated that the standard utility frequency may vary depending on, for example, the geographical region. The PLC circuitry 118 may be configured to use any one or more communication technologies suitable for power line communication.

In some embodiments, the electronic device 102 may include one or more security engines 120, which may perform various security and cryptographic procedures. In some embodiments, the security engine 120 may be embodied as a security co-processor such as, for example, a Trusted Platform Module (TPM), a manageability engine (ME), or an out-of-band processor. In other embodiments, the security engine 120 may be embodied as, or otherwise include, a cryptographic accelerator incorporated into the processor 112 or a stand-alone cryptographic software/firmware. The peripheral devices 122 of the electronic device 102 may include any number of additional peripheral or interface devices. The particular devices included in the peripheral devices 122 may depend on, for example, the intended use of the electronic device 102.

The circuit interrupter 124 may be embodied as any type of device, electrical component, circuitry, or instructions in the memory 116 capable of preventing the execution of one or more functions of the electronic device 102 (e.g., power). In some embodiments, the circuit interrupter 124 may be embodied as a hardware component such as, for example, an electronic switch, a relay, or a solid state device. In other embodiments, the circuit interrupter 124 may be implemented using a control board including, for example, a microprocessor or other processing components. In some embodiments, the circuit interrupter 124 is integrated into or otherwise forms part of a critical component of the electronic device 102 such that it is difficult to remove the circuit interrupter 124.

The PLC network 104 may be embodied as any power line communication network capable of performing the functions described herein. The security server 106 may be embodied as any server or computing device capable of communicating with the electronic device 102 over the PLC network 104 and with the computing device 110 over the network 108 and performing the functions described herein. For example, in some embodiments, the security server 106 may be embodied as a PLC adapter. The illustrative security server 106 includes a processor 152, an I/O subsystem 154, a memory 156, a PLC circuitry 160, and a security engine 164. Those components of the security server 106 may be similar to the corresponding components of the electronic device 102, the description of which is applicable to the corresponding components of the security server 106 and is not repeated herein for clarity of the description.

In the illustrative embodiment, the security server 106 also includes a communication circuitry 158 and data storage 162. The communication circuitry 158 of the security server 106 may be embodied as any communication circuit, device, or collection thereof, capable of enabling communications between the electronic device 102 and the computing device 110 and/or other remote devices. The communication circuitry 158 may be configured to use any one or more communication technologies (e.g., wireless or wired communications) and associated protocols to effect such communication. The data storage 162 may be embodied as any type of device or devices configured for short-term or long-term storage of data such as, for example, memory devices and circuits, memory cards, hard disk drives, solid-state drives, or other data storage devices. In the illustrative embodiment, the security server 106 may store cryptographic keys and device data associated with one or more electronic device 102 and/or other information in the data storage 162. Although the illustrative embodiment shows the PLC circuitry 160 as a part of the communication circuitry 158, in some embodiments the communication circuitry 158 and the PLC circuitry 160 are distinct. Furthermore, it should be appreciated that the security server 150 may include other components, sub-components, and devices commonly found in a computing device, which are not illustrated in FIG. 1 for clarity of the description.

The network 108 may be embodied as any type of network capable of facilitating communication between the security server 106 and remote computing devices (e.g., the computing device 110). As such, the network 108 may include one or more networks, routers, switches, computers, and/or other intervening devices. In an illustrative embodiment, the network 108 is embodied as a local area network such as a home or business network. The computing device 110 may be embodied as any computing device capable of performing the functions described herein. The computing device 110 may include components similar to the security server 106 and/or components commonly found in a computing device, such as a processor, memory, I/O subsystem, data storage, peripheral devices, and so forth, which are not illustrated in FIG. 1 for clarity of the description.

The system 100 may be used in different embodiments for an array of different purposes. For example, in one embodiment, the system 100 may be implemented to deter theft. That is, in some embodiments, the system 100 may be used to register one or more electronic devices 102 for access to the PLC network 104 associated with the security server 106. After registering an electronic device 102 in such an embodiment, as discussed in detail below, the circuit interrupter 124 of the electronic device 102 only permits the electronic device 102 to fully and properly function when the electronic device 102 is connected to the power line associated with the PLC network 104 of the security server 106 on which the electronic device 102 was registered. As such, an electronic device 102 would not operate correctly, or at all in some embodiments, if stolen and connected to a different PLC network 104 (e.g., via the power line at the thief's house).

Figure 2:
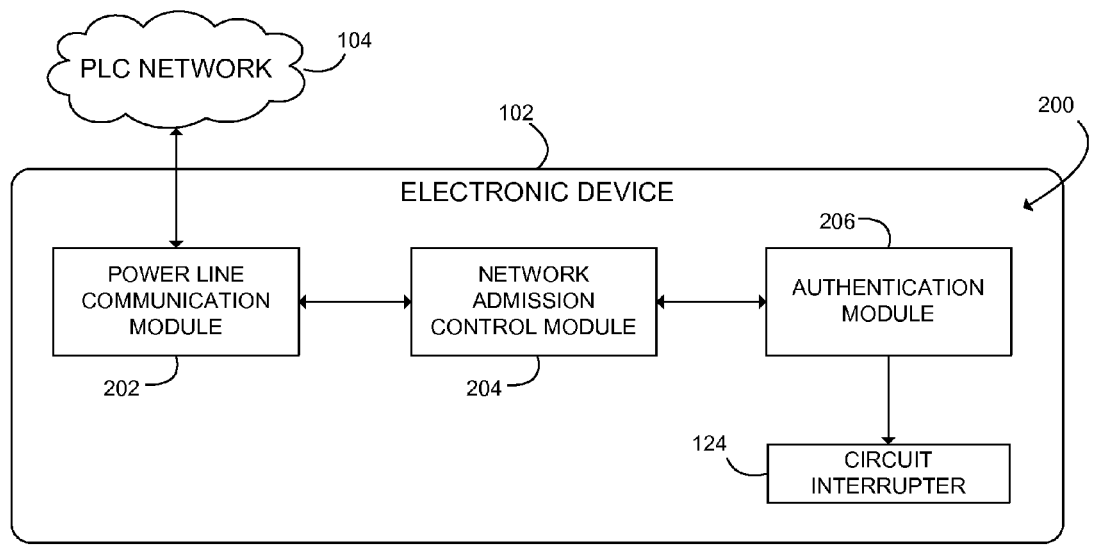
FIG. 2 is a simplified block diagram of at least one embodiment of an environment of an electronic device of the system of FIG. 1.

Referring now to FIG. 2, in use, the electronic device 102 may establish an environment 200 for managing the circuitry of the electronic device 102. The environment 200 in the illustrative embodiment includes a power line communication module 202, a network admission control module 204, an authentication module 206, and the circuit interrupter 124.

The power line communication module 202 may handle communication between the electronic device 102 and remote devices (e.g., the security server 106) through the PLC network 104. In some embodiments, the power line communication module 202 may handle functions that occur within the data plane of a power line communication device. For example, in some embodiments, the power line communication module 202 may handle functions within one or more of the physical layer and the media access control layer. The power line communication module 202 transmits and/or receives data over the PLC network 104 using, for example, carrier modulation and demodulation techniques or other suitable techniques. In some embodiments, the power line communication module 202 also provides channel access control, performs packet fragmentation, performs packet reassembly, and/or handles the addressing, encryption, and decryption of data packets.

The network admission control module 204 may manage bandwidth and/or encryption keys (e.g., network management and device encryption keys) associated with the PLC network 104 and/or perform cryptographic functions. In some embodiments, the network admission control module 204 is a central coordinator, which handles functions (e.g., vendor-independent functions and commands) within the control plane of a power line communication device. As discussed below, in some embodiments, the network admission control module 204 manages the network management key of the electronic device 102, which may be used to join a logical network (e.g., the PLC network 104). Further, in some embodiments, the network admission control module 204 also manages the device encryption key of the electronic device 102.

The authentication module 206 may manage cryptographic keys, perform cryptographic functions, and/or handle vendor-specific commands. In some embodiments, the authentication module 206 of the electronic device 102 operates in the control plane of the electronic device 102. Further, in some embodiments, the authentication module 206 may receive a command to change the device encryption key of the electronic device 102 from a corresponding authentication module 306 of the security server 106. The authentication module 206 may also instruct the circuit interrupter 124 when to interrupt one or more functions of the electronic device 102. Each of the power line communication module 202, the network admission control module 204, the authentication module 206, and the circuit interrupter 124 may be embodied as hardware, software, firmware, or a combination thereof.

Figure 3:
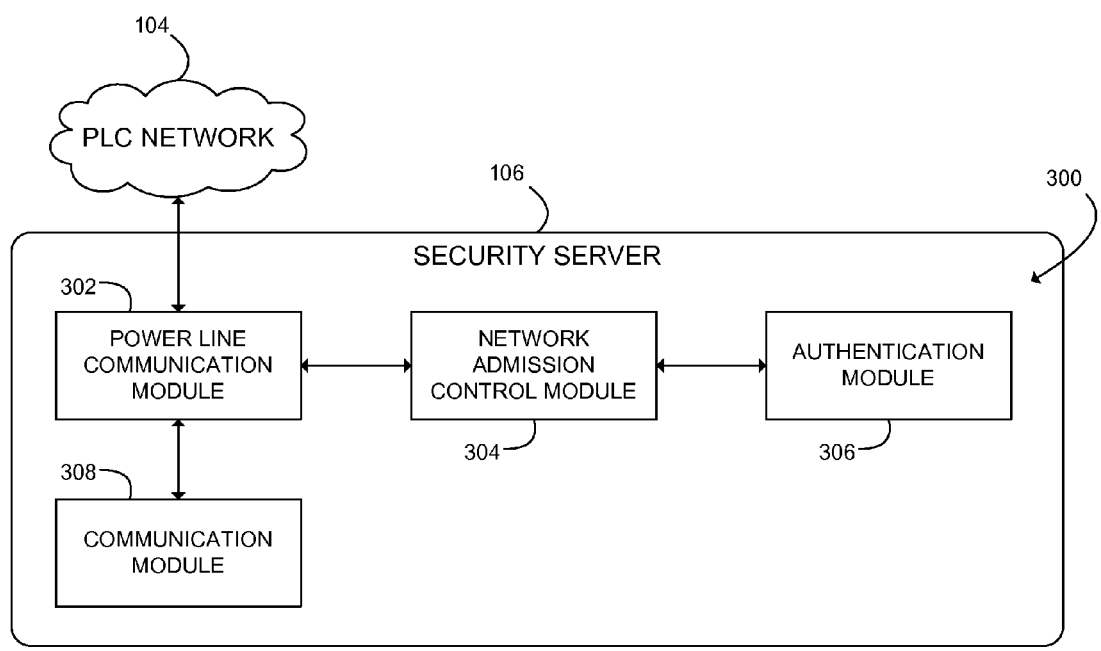
FIG. 3 is a simplified block diagram of at least one embodiment of an environment of a security server of the system of FIG. 1.

As shown in FIG. 3, in use, the security server 106 may establish an environment 300 for enforcing security of the electronic device 102. The environment 300 in the illustrative embodiment includes a power line communication module 302, a network admission control module 304, an authentication module 306, and a communication module 308. The power line communication module 302, the network admission control module 304, and the authentication module 306 may be similar to the corresponding components of the environment 200 of the electronic device 102, the description of which is not repeated herein for clarity of description. Further, as discussed below, in some embodiments, the authentication module 306 may generate a new device encryption key for the electronic device 102 and generate an asymmetric key pair (e.g., authentication keys), which may be used to encrypt vendor-specific commands (e.g., commands to change the device encryption key). The communication module 308 may handle communication between the security server 106 and remote computing devices (e.g., the computing device 110) over the network 108. Each of the power line communication module 302, the network admission control module 304, the authentication module 306, and the communication module 308 may be embodied as hardware, software, firmware, or a combination thereof.

Figure 4:
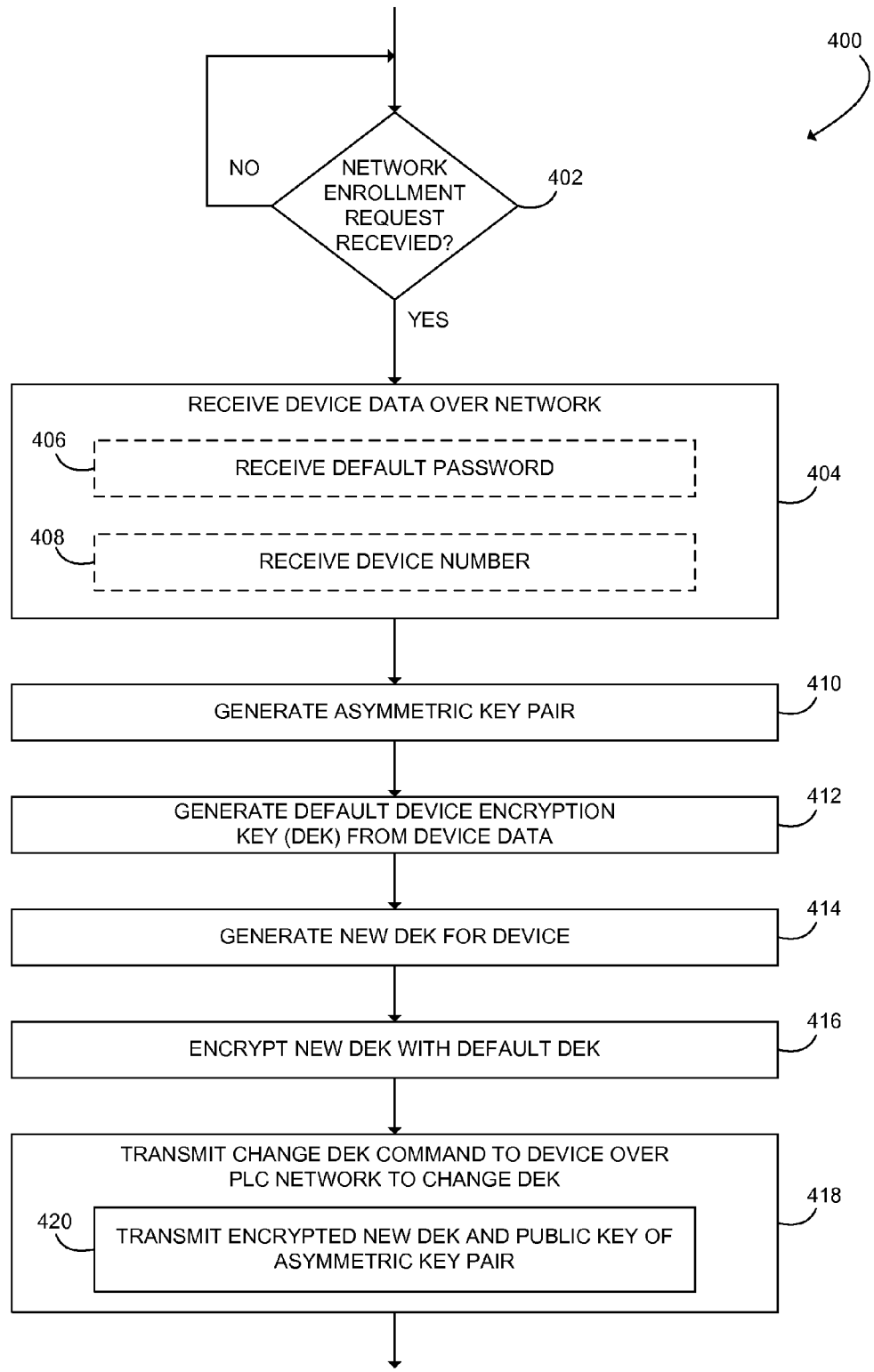
FIG. 4 is a simplified flow diagram of at least one embodiment of a method for enforcing security on an electronic device over a power line communication network using the security server of the system of FIG. 1.

Referring now to FIG. 4, an illustrative embodiment of a method 400 for enforcing security on the electronic device 102 over the PLC network 104, which may be executed by the security server 106, begins with block 402. In block 402, the security server 106 determines whether a network enrollment request has been received. In some embodiments, a user of the computing device 110 may register or enroll one or more electronic devices 102 for access to the PLC network 104. For example, in some embodiments, the computing device 110 may execute a configuration application permitting the user to enter certain information regarding the electronic device 102 (i.e., device data). In block 404, the security server 106 receives device data from the computing device 110 over the network 108. Depending on the particular embodiment, the security server 106 may receive one or more of a default password, unique device number, or other identifying information associated with the electronic device 102. In some embodiments, a default password and/or unique device number are assigned to the electronic device 102 during the manufacturing process. For example, the default password or unique device number may be written on the electronic device 102 itself (e.g., on a sticker of the device) or on documentation included with the electronic device 102 (e.g., an owner's manual). In other embodiments, the default password and/or unique device number may be stored on memory of the electronic device 102 and configured to be transmitted to the security server 106 in response to the enrollment request of the computing device 110.

In block 410, the security server 106 generates an asymmetric cryptographic key pair (i.e., authentication key pair) including a public key and a private key. It should be appreciated that the asymmetric cryptographic key pair may be generated using any suitable cryptographic procedure. In block 412, the security server 106 generates a default device encryption key from the device data received in block 404. In some embodiments, the default device encryption key may be generated as a function of the device data (e.g., the default password or unique device number) using a known cryptographic algorithm. That is, in some embodiments, the default device encryption key may be generated by any security server 106 if the security server 106 knows the device data associated with the particular electronic device 102. In the illustrative embodiment, the default device encryption key is a symmetric cryptographic key.

In block 414, the security server 106 generates a new device encryption key for the electronic device 102 and associates the electronic device 102 with the new device encryption key. In some embodiments, the new device encryption key is generated using the same cryptographic algorithm as that of the default device encryption key but configured to generate a different key (e.g., using a different function value or seed value than the device data). In other embodiments, the security server 106 generates the new device encryption key as a symmetric cryptographic key using any suitable cryptographic procedure. For example, the security server 106 may generate the new device encryption key using a different algorithm than that of the default device encryption key and require that the new device encryption key and default device encryption key are different cryptographic keys. It should be appreciated that the asymmetric key pair, the default device encryption key, and the new device encryption key may be generated in any appropriate order, including in parallel.

In block 416, the security server 106 encrypts the new device encryption key with the default device encryption key. In block 418, the security server 106 transmits a change device encryption key command to the electronic device 102 over the PLC network 104 requesting the electronic device 102 to change its device encryption key. In doing so, in block 420, the security server 106 may transmit the encrypted new device encryption key and the public key of the asymmetric key pair to the electronic device 102. In the illustrative embodiment, the change device encryption key command is a vendor-specific command (e.g., "set DEK") handled by the authentication module 206 of the electronic device 102.

Figure 5:
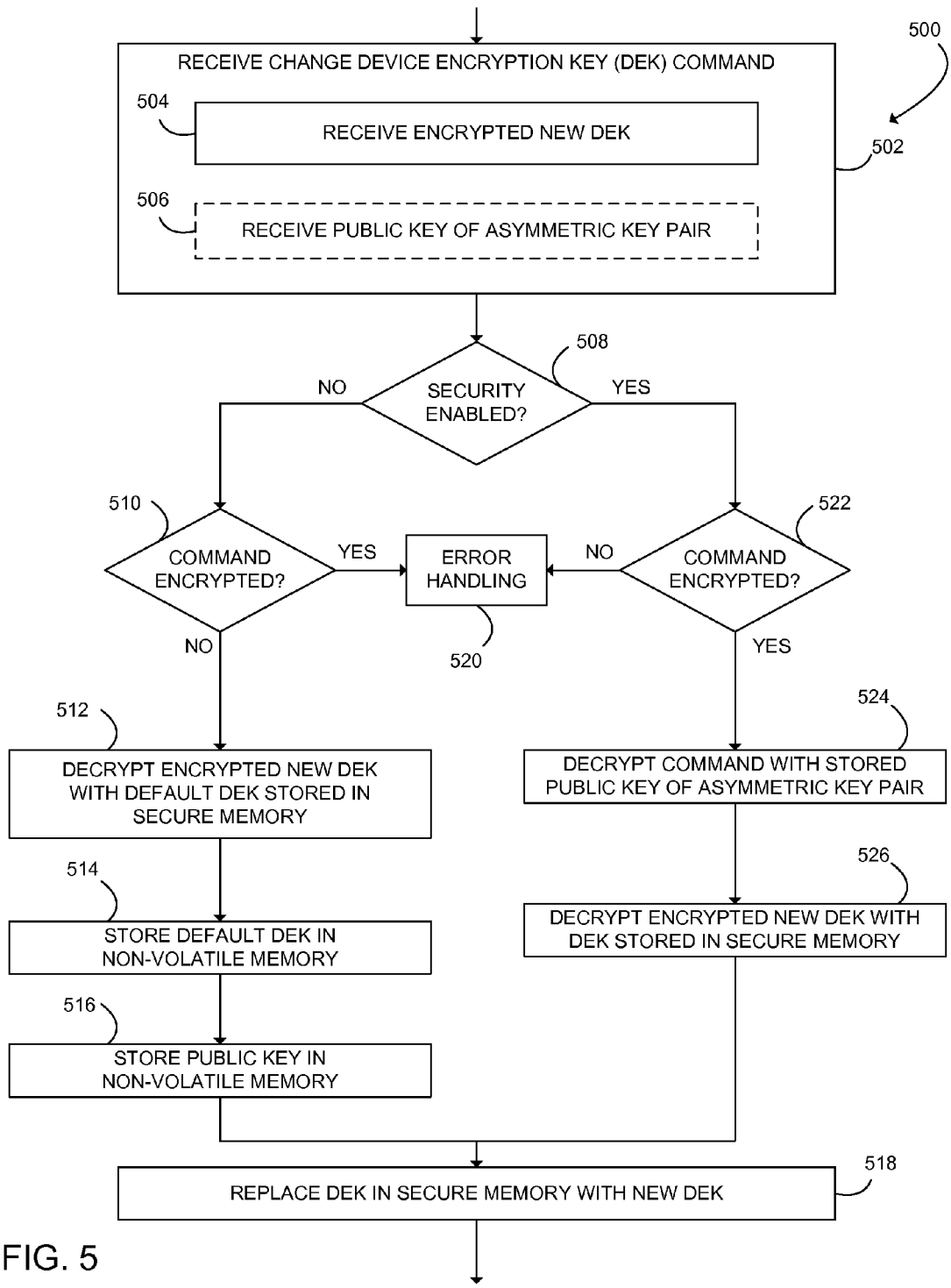
FIG. 5 is a simplified flow diagram of at least one embodiment of a method for changing a device encryption key on an electronic device of the system of FIG. 1.

Referring now to FIG. 5, an illustrative embodiment of a method 500 for changing a device encryption key, which may be executed by the electronic device 102, begins with block 502. In block 502, the electronic device 102 receives a change device encryption key command (for example, see block 418 of FIG. 4) from the security server 106 over the PLC network 104. As discussed above, the change device encryption key command requests the electronic device 102 to change its device encryption key. The electronic device 102 may also receive an encrypted new device encryption key from the security server 106 with, included in, or otherwise associated with the change device encryption key command. In the illustrative embodiment, the new device encryption key is encrypted with the current device encryption key of the electronic device 102. For example, in the first instance of the change device encryption key command received by the electronic device 102, the current device encryption key is the default device encryption key. As such, the security server 106 encrypts the new device encryption key with the default encryption key. In subsequent iterations of the method 500 (i.e., changes of the device encryption key), however, the security server 106 may encrypt the new device encryption key with the current device encryption key associated with the electronic device 102. In block 506, the electronic device 102 may also receive the public key of the asymmetric key pair generated by the security server 106 in block 410 of FIG. 4. In some embodiments, the public key is received only when the device encryption key is first changed (i.e., upon receipt of the first change device encryption key command) In other embodiments, a new public key is received from the security server 106 each time the security server 106 requests the electronic device 102 to change its device encryption key.

In some embodiments, the change device encryption key command may be encrypted using the private key of the asymmetric key pair generated by the security server 106 in block 410 of FIG. 4, and security may be enabled on the electronic device 102. As discussed below (see block 516), the electronic device 102 may store the public key of the asymmetric key pair received in block 506 on the memory 116 (e.g., non-volatile memory) of the electronic device 102. In block 508, the electronic device 102 determines whether security is enabled on the electronic device 102. In some embodiments, if the public key is stored on the memory 116, the electronic device 102 may infer that security is enabled. In other embodiments, the electronic device 102 may, alternatively or additionally, check a flag or bit (e.g., status flag) or other data to determine whether security is enabled. If the electronic device 102 determines that security is not enabled, the method advances to block 510 in which the electronic device determines whether the change device encryption key command is encrypted. If not, then in block 512, the electronic device 102 may decrypt the received encrypted new device encryption key using a default device encryption key stored in the secure memory 126. In some embodiments, the device encryption key is accessible to the network admission control module 204 for use in decrypting a network membership key as discussed below.

In some embodiments, in block 514, the electronic device 102 stores the default device encryption key in the memory 116 (e.g., non-volatile memory) using the authentication module 206. By storing the default device encryption key, the authentication module 206 is able to restore the electronic device 102 to its default state at a later point in time, for example, if the electronic device 102 unregisters from access to the PLC network 104. In block 516, the public key received in block 506 is also stored in the memory 116 for use in decrypting subsequent change device encryption key commands and/or other vendor-specific commands received from the security server 106. In block 518, the electronic device 102 replaces the device encryption key stored in the secure memory 126 (i.e., the default device encryption key) with the decrypted new device encryption key.

Referring back to block 510, if the electronic device 102 determines, however, that the change device encryption key command is encrypted, the electronic device 102 determines that an error has occurred. As such, in block 520, the electronic device 102 handles the error using any suitable means or process. That is, in the illustrative example, the change device encryption key command should not in ordinary operations be encrypted unless security is enabled (i.e., the public key is stored in the memory 116). In some embodiments, such an error may indicate, for example, a fraudulent or otherwise illegitimate process has occurred (e.g., a rogue server or a malicious party masquerading as the intended security server 106). In handling the error, the electronic device 102 may, for example, transmit an error message to the user indicating such error.

Referring now back to block 508, if the electronic device 102 determines that security is enabled, the method 500 advances to block 522 in which the electronic device 102 further determines whether the changed device encryption key command is encrypted. If so, the electronic device 102 decrypts the encrypted change device encryption key command using the stored public key in block 524. In block 526, the electronic device 102 then decrypts the received encrypted new device encryption key using the device encryption key stored in the secure memory 126 of the electronic device 102. In the illustrative embodiment, the device encryption key stored in the secure memory 126 is not the default device encryption key. For example, it may have been changed by previous execution of the method 500. After decrypting the new device encryption key, the electronic device 102 replaces the device encryption key is the secure memory 126 with the new device encryption key in block 518. If, however, the electronic device 102 determines that the change device encryption key command is not encrypted in block 522, the electronic device 102 determines that an error has occurred (i.e., that security has been enabled, but the change device encryption key command was not encrypted). As such, the method 500 advances to block 520 in which the electronic device 102 handles the error as discussed above.

Referring now to FIG. 6, an illustrative embodiment of a method 600 for managing circuitry, which may be executed by the electronic device 102, begins with block 602. In block 602, the electronic device 102 determines whether security is enabled. If not, the electronic device 102 closes the circuit using the circuit interrupter 124 in block 604. As discussed above, the circuit interrupter 124 is configured to disable one or more functions of the electronic device 102. As such, "closing" the circuit allows the one or more functions to operate correctly and is not limited to closing a physical circuit. Additionally, in some embodiments, closing the circuit may not comprise an affirmative action but rather the circuit interrupter's 124 lack of interrupting the circuit. As discussed above, if security has not been enabled, then the default device encryption key of the electronic device 102 has not yet been changed.

If the electronic device 102 determines that security is enabled, the electronic device 102 interrupts the circuit using the circuit interrupter 124 in block 606. As discussed above, the circuit interrupter 124 may "interrupt" the circuit by preventing the electronic device 102 from performing one or more functions. In block 608, the electronic device 102 establishes a connection with the security server 106 over the PLC network 104. In some embodiments, if the electronic device 102 is unable to establish a connection with the security server 106, the electronic device 102 retries to connect. In other embodiments, the method 600 returns to block 602 if the electronic device 102 fails to establish a connection with the security server 106.

In block 610, the electronic device 102 receives an encrypted network membership key, which has been encrypted with the device encryption key associated with the electronic device 102, from the security server 106. In block 612, the electronic device 102 decrypts the encrypted network membership key using the device encryption key stored in the secure memory 126. It should be appreciated that the decryption will only be successful if the device encryption key used to encrypt the network membership key corresponds with the device encryption key stored in the secure memory 126. For example, the keys correspond if they are matching cryptographic keys (e.g., they are a valid encryption/decryption key pair and/or are the same symmetric cryptographic key). If the electronic device 102 is attempting to connect to the security server 106 in which it has enrolled/registered to access the PLC network 104, then the keys should correspond. However, if the electronic device 102 is attempting to connect to a different security server 106, the different security server 106 will associate the default device encryption key with the electronic device 102, which will not correspond with the device encryption key stored in the secure memory 126 of the electronic device 102 (i.e., the device encryption key that was stored in the electronic device 102 to replace the default device encryption key during enrollment). That is, in some embodiments, the network management key of the electronic device 102 may not be reset or changed by a security server 106 other than the security server 106 with which the electronic device 102 is enrolled, because the other security server 106 does not know the non-default device encryption key of the electronic device 102.

In block 614, the electronic device 102 determines whether the decryption was successful. If not, the electronic device 102 interrupts the circuit in block 616. However, if the decryption is successful, the electronic device 102 stores the network membership key on the electronic device 102 in block 620. In block 622, the electronic device 102 joins the PLC network 104 using the network membership key. Further, the electronic device 102 may close the circuit in block 622 to enable the functions of the electronic device 102 in response to the electronic device 102 successfully joining the PLC network 104.

Examples

Illustrative examples of the devices, systems, and methods disclosed herein are provided below. An embodiment of the devices, systems, and methods may include any one or more, and any combination of, the examples described below.

Example 1 includes an electronic device for establishing a connection with a power line communication network comprising a memory; a power line communication module to (i) establish a communication connection with a security server over the power line communication network and (ii) receive a network membership key encrypted with a first device encryption key from the security server; a network admission control module to (i) decrypt the encrypted network membership key using a second device encryption key stored on the memory and (ii) determine whether the encrypted network membership key was successfully decrypted; and a circuit interrupter to interrupt a circuit of the electronic device in response to the network admission control module determining that the encrypted network membership key was not successfully decrypted.

Example 2 includes the subject matter of Example 1, and wherein the power line communication module is to join the power line communication network using the decrypted network membership key in response to determining that the encrypted network membership key was successfully decrypted.

Example 3 includes the subject matter of any of Examples 1 and 2, and wherein the circuit interrupter is to allow the circuit to receive power from a power line of the power line communication network in response to the electronic device joining the power line communication network.

Example 4 includes the subject matter of any of Examples 1-3, and wherein the circuit interrupter is to interrupt the circuit by opening a circuit breaker of the electronic device to prevent one or more functions of the electronic device from operating.

Example 5 includes the subject matter of any of Examples 1-4, and wherein the circuit interrupter comprises at least one of: an electronic switch, a relay, and a solid state device.

Example 6 includes the subject matter of any of Examples 1-5, and wherein the network admission control module is to determine whether the encrypted network membership key was successfully decrypted by determining whether the first device encryption key and the second device encryption key are matching cryptographic keys.

Example 7 includes the subject matter of any of Examples 1-6, and further including an authentication module to determine whether security is enabled on the electronic device, wherein the circuit interrupter is to interrupt the circuit in response to determining that security is enabled on the electronic device.

Example 8 includes the subject matter of any of Examples 1-7, and wherein the authentication module is to determine whether security is enabled by performing at least one of: determining whether an asymmetric cryptographic security key is stored on the electronic device and determining the status of a flag.

Example 9 includes the subject matter of any of Examples 1-8, and wherein the power line communication module is to receive a change device encryption key command from the security server, the change device encryption key command including an encrypted new device encryption key; and the network admission control module is to (i) decrypt the encrypted new device encryption key using the second device encryption key stored on the memory and (ii) replace the second device encryption key with the decrypted new device encryption key.

Example 10 includes the subject matter of any of Examples 1-9, and wherein the authentication module is to decrypt the change device encryption key command using the stored asymmetric cryptographic security key in response to determining that the change device encryption key command is encrypted and security is enabled.

Example 11 includes the subject matter of any of Examples 1-10, and wherein the authentication module is to store the second device encryption key and the asymmetric cryptographic security key in the memory in response to determining that at least one of (i) the change device encryption key command is not encrypted and (ii) security is not enabled, wherein (i) the changed device encryption key command includes the asymmetric cryptographic security key and (ii) the second device encryption key is a default device encryption key.

Example 12 includes the subject matter of any of Examples 1-11, and wherein the default device encryption key may be generated by the security server as a function of one or more of: a default password associated with the electronic device and a unique device number associated with the electronic device.

Example 13 includes a security server for enforcing security on an electronic device over a power line communication network, the security server comprising a communication module to receive device data associated with the electronic device from a computing device over a communication network different from the power line communication network; a network admission control module to generate a default device encryption key as a function of the device data; an authentication module to (i) generate a new device encryption key and an asymmetric cryptographic key pair, the asymmetric cryptographic key pair including a public key and a private key, (ii) associate the electronic device with the new device encryption key, and (iii) encrypt the new device encryption key using the default device encryption key; and a power line communication module to transmit a change device encryption key command to the electronic device over the power line communication network, the change device encryption key command including the encrypted new device encryption key and the public key.

Example 14 includes the subject matter of Example 13, and wherein the device data comprises at least one of: a default password associated with the electronic device and a unique device number associated with the electronic device.

Example 15 includes the subject matter of any of Examples 13 and 14, and wherein the network admission control module is to encrypt a network membership key using a device encryption key associated with the electronic device; and the power line communication module is to transmit the encrypted network membership key to the electronic device.

Example 16 includes the subject matter of any of Examples 13-15, and wherein the power line communication module is to receive a decrypted network membership key from the electronic device; and the network admission control module is to permit the electronic device to access the power line if the decrypted network membership key and the network membership key are matching cryptographic keys.

Example 17 includes a method for establishing a connection with a power line communication network on an electronic device, the method comprising establishing, using the electronic device, a communication connection with a security server over the power line communication network; receiving, with the electronic device, a network membership key encrypted with a first device encryption key from the security server; decrypting, on the electronic device, the encrypted network membership key using a second device encryption key stored on the electronic device; determining, using the electronic device, whether the encrypted network membership key was successfully decrypted; interrupting a circuit of the electronic device in response to determining that the encrypted network membership key was not successfully decrypted.

Example 18 includes the subject matter of Example 17, and further including joining, with the electronic device, the power line communication network using the decrypted network membership key in response to determining that the encrypted network membership key was successfully decrypted.

Example 19 includes the subject matter of any of Examples 17 and 18, and further including allowing the circuit to receive power from a power line of the power line communication network in response to joining the power line communication network.

Example 20 includes the subject matter of any of Examples 17-19, and wherein interrupting the circuit comprises opening a circuit breaker of the electronic device to prevent one or more functions of the electronic device from operating.

Example 21 includes the subject matter of any of Examples 17-20, and wherein opening the circuit breaker comprises operating at least one of: an electronic switch, a relay, and a solid state device.

Example 22 includes the subject matter of any of Examples 17-21, and wherein determining whether the encrypted network membership key was successfully decrypted comprises determining whether the first device encryption key and the second device encryption key are matching cryptographic keys.

Example 23 includes the subject matter of any of Examples 17-22, and further including determining whether security is enabled on the electronic device; and interrupting the circuit in response to determining that security is enabled on the electronic device.

Example 24 includes the subject matter of any of Examples 17-23, and wherein determining whether security is enabled comprises determining whether an asymmetric cryptographic security key is stored on the electronic device.

Example 25 includes the subject matter of any of Examples 17-24, and further including receiving, with the electronic device, a change device encryption key command from the security server, the change device encryption key command including an encrypted new device encryption key; decrypting, using the electronic device, the encrypted new device encryption key using the second device encryption key stored on the electronic device; and replacing, on the electronic device, the second device encryption key with the decrypted new device encryption key.

Example 26 includes the subject matter of any of Examples 17-25, and further including decrypting, using the electronic device, the change device encryption key command using the stored asymmetric cryptographic security key in response to determining that the change device encryption key command is encrypted and security is enabled.

Example 27 includes the subject matter of any of Examples 17-26, and further including storing, on the electronic device, the second device encryption key and the asymmetric cryptographic security key in response to determining that at least one of (i) the change device encryption key command is not encrypted and (ii) security is not enabled, wherein (i) the changed device encryption key command includes the asymmetric cryptographic security key and (ii) the second device encryption key is a default device encryption key.

Example 28 includes the subject matter of any of Examples 17-27, and wherein the default device encryption key may be generated by the security server as a function of one or more of: a default password associated with the electronic device and a unique device number associated with the electronic device.

Example 29 includes a computing device comprising a processor; and a memory having stored therein a plurality of instructions that when executed by the processor cause the computing device to perform the method of any of Examples 17-28.

Example 30 includes one or more machine readable storage media comprising a plurality of instructions stored thereon that in response to being executed result in a computing device performing the method of any of Examples 17-28.

Example 31 includes a method for enforcing security on an electronic device over a power line communication network, the method comprising receiving, with a security server, device data associated with the electronic device from a computing device over a communication network different from the power line communication network; generating, on the security server, a default device encryption key as a function of the device data; generating, on the security server, a new device encryption key and an asymmetric cryptographic key pair, the asymmetric cryptographic key pair including a public key and a private key; associating, on the security server, the electronic device with the new device encryption key; encrypting, using the security server, the new device encryption key using the default device encryption key; and transmitting, from the security server, a change device encryption key command to the electronic device over the power line communication network, the change device encryption key command including the encrypted new device encryption key and the public key.

Example 32 includes the subject matter of Example 31, and wherein receiving the device data comprises receiving at least one of: a default password associated with the electronic device and a unique device number associated with the electronic device.

Example 33 includes the subject matter of any of Examples 31 and 32, and further including encrypting, using the security server, a network membership key using a device encryption key associated with the electronic device; and transmitting, from the security server, the encrypted network membership key to the electronic device.

Example 34 includes the subject matter of any of Examples 31-33, and further including receiving, with the security server, a decrypted network membership key from the electronic device; permitting, using the security server, the electronic device to access the power line if the decrypted network membership key and the network membership key are the same cryptographic key.

Example 35 includes a computing device comprising a processor; and a memory having stored therein a plurality of instructions that when executed by the processor cause the computing device to perform the method of any of Examples 31-34.

Example 36 includes one or more machine readable storage media comprising a plurality of instructions stored thereon that in response to being executed result in a computing device performing the method of any of Examples 31-34.

The invention claimed is:

1. An electronic device for power line based theft protection, the electronic device comprising:
   a memory;
   a power line communication module to (i) establish a power line communication connection with a security server over the power line and (ii) receive a network membership key encrypted with a first device encryption key from the security server over the power line;
   a network admission control module to (i) decrypt the encrypted network membership key with a second device encryption key stored on the memory and (ii) determine whether the encrypted network membership key was successfully decrypted; and
   a hardware circuit interrupter to physically interrupt an electrical circuit of the electronic device in response to a determination by the network admission control module that the encrypted network membership key was not successfully decrypted.

2. The electronic device of claim 1, wherein the power line communication module is to use the decrypted network membership key to join a power line communication network in response to a determination that the encrypted network membership key was successfully decrypted.

3. The electronic device of claim 2, wherein the hardware circuit interrupter is to allow the electrical circuit to receive power from the power line in response to a determination that the electronic device has joined the power line communication network.

4. The electronic device of claim 1, wherein to interrupt the electrical circuit comprises to open an electrical circuit breaker of the electronic device to prevent operation of one or more functions of the electronic device.

5. The electronic device of claim 4, wherein the hardware circuit interrupter comprises an electronic switch.

6. The electronic device of claim 4, wherein the hardware circuit interrupter comprises a solid state device.

7. The electronic device of claim 1, wherein the electronic device comprises an electronic appliance.

8. The electronic device of claim 1, wherein the hardware circuit interrupter integrally forms a part of a critical component of the electronic device.

9. The electronic device of claim 1, wherein to establish the power line communication connection with the security server comprises to establish a power line communication connection with a power line communication adaptor.

10. One or more non-transitory machine-readable storage media comprising a plurality of instructions stored thereon that, in response to execution by an electronic device, cause the electronic device to:
    establish a power line communication connection with a security server over a power line;
    receive a network membership key encrypted with a first device encryption key from the security server over the power line;
    decrypt the encrypted network membership key with a second device encryption key stored on the electronic device;
    determine whether the encrypted network membership key was successfully decrypted; and
    physically interrupt an electrical circuit of the electronic device with a hardware circuit interrupter in response to a determination that the encrypted network membership key was not successfully decrypted.

11. The one or more non-transitory machine-readable storage media of claim 10, wherein the plurality of instructions further cause the electronic device to use the decrypted network membership key to join a power line communication network in response to a determination that the encrypted network membership key was successfully decrypted.

12. The one or more non-transitory machine-readable storage media of claim 11, wherein the plurality of instructions further cause the hardware circuit interrupter to allow the electrical circuit to receive power from the power line in response to a determination that the electronic device has joined the power line communication network.

13. The one or more non-transitory machine-readable storage media of claim 10, wherein to interrupt the electrical circuit comprises to open an electrical circuit breaker of the electronic device to prevent operation of one or more functions of the electronic device.

14. The one or more non-transitory machine-readable storage media of claim 13, wherein the hardware circuit interrupter comprises at least one of an electronic switch, a relay, or a solid state device.

15. The one or more non-transitory machine-readable storage media of claim 10, wherein the electronic device comprises an electronic appliance.

16. The one or more non-transitory machine-readable storage media of claim 10, wherein the electronic device is embodied as one of a television or a video projector.

17. The one or more non-transitory machine-readable storage media of claim 10, wherein the hardware circuit interrupter integrally forms a part of a critical component of the electronic device.

18. The one or more non-transitory machine-readable storage media of claim 10, wherein to establish the power line communication connection with the security server comprises to establish a power line communication connection with a power line communication adaptor.

19. A security server for power line based theft protection, the security server comprising:
    a power line communication module to communicate over the power line;
    a communication module to receive device data associated with an electronic device from a computing device over a communication network different from a power line communication network of the security server, wherein the power line communication network is established between the security server and the electronic device over the power line;
    a network admission control module to generate a default device encryption key as a function of the device data; and
    an authentication module to (i) generate a new device encryption key and an asymmetric cryptographic key pair, the asymmetric cryptographic key pair including a public key and a private key, (ii) associate the electronic device with the new device encryption key, and (iii) encrypt the new device encryption key with the default device encryption key;
    wherein the power line communication module is further to transmit a change device encryption key command to the electronic device over the power line communication network, wherein the change device encryption key command includes the encrypted new device encryption key and the public key.

20. The security server of claim 19, wherein:
    the network admission control module is to encrypt a network membership key with a device encryption key associated with the electronic device; and
    the power line communication module is to transmit the encrypted network membership key to the electronic device over the power line communication network.

* * * * *